(12) United States Patent
Kudlinski et al.

(10) Patent No.: US 8,643,940 B2
(45) Date of Patent: Feb. 4, 2014

(54) SYSTEM FOR CONTINUOUSLY GENERATING POLYCHROMATIC LIGHT BY MEANS OF DOPED MICROSTRUCTURED OPTICAL FIBRE

(75) Inventors: Alexandre Kudlinski, Salome (FR); Arnaud Mussot, Hellemmes (FR); Geraud Pierre Bouwmans, Lille (FR); Gilles Rene Melin, Orsay (FR)

(73) Assignee: Centre National de la Recherche Scientifique—CNRS, Paris Cedex (FR)

( * ) Notice: Subject to any disclaimer, the term of this patent is extended or adjusted under 35 U.S.C. 154(b) by 0 days.

(21) Appl. No.: 13/503,094

(22) PCT Filed: Oct. 20, 2010

(86) PCT No.: PCT/FR2010/052234
§ 371 (c)(1),
(2), (4) Date: Jul. 9, 2012

(87) PCT Pub. No.: WO2011/048329
PCT Pub. Date: Apr. 28, 2011

(65) Prior Publication Data
US 2012/0268807 A1 Oct. 25, 2012

(30) Foreign Application Priority Data
Oct. 22, 2009 (FR) ...................................... 09 05092

(51) Int. Cl.
*G02F 1/365* (2006.01)
(52) U.S. Cl.
USPC .............................. 359/326; 372/6; 385/122
(58) Field of Classification Search
USPC ............ 359/326–332; 372/6, 21, 22; 385/122
See application file for complete search history.

(56) References Cited

U.S. PATENT DOCUMENTS

| 6,972,894 B2 * | 12/2005 | Bjarklev et al. ................ 359/332 |
| 7,280,567 B2 * | 10/2007 | Luo et al. ........................... 372/6 |
| 7,768,691 B2 | 8/2010 | Nerin et al. |
| 7,800,817 B2 | 9/2010 | Couderc et al. |

FOREIGN PATENT DOCUMENTS

| FR | 2867574 A1 | 9/2005 | |
| FR | 2884623 A1 | 10/2006 | |
| FR | 2942553 A1 * | 8/2010 | ................ G02F 1/35 |
| WO | WO 03038486 A2 * | 5/2003 | ............... G02B 6/02 |
| WO | 2006108966 A1 | 10/2006 | |

OTHER PUBLICATIONS

Alexandre Kudlinski et al.; "Visible cw-pumped Supercontinuum"; Oct. 15, 2008; Optics Letters; Optical Society of America; XP-001519499; Washington, D.C., US; vol. 33, No. 20, pp. 2407-2409.

(Continued)

*Primary Examiner* — Daniel Petkovsek
(74) *Attorney, Agent, or Firm* — Bachman & LaPointe, P.C.

(57) ABSTRACT

A system for generating polychromatic light, which includes: an optical pumping device suitable for continuously or quasi-continuously emitting a monochromatic or quasi-monochromatic radiation according to a pumping wavelength; a device for guiding light arranged such as to emit polychromatic radiation continuously or quasi continuously, at the output thereof, and a device for coupling between the pumping and coupling device. In the system, the guiding device, includes a microstructured optical fiber in which the core is at least partially doped with a material having a high intrinsic non-linear response, and the geometry of the optical fiber and the doping rate of the core thereof are predetermined such as to adapt the zero dispersion length of the optical fiber to the pumping wavelength.

17 Claims, 5 Drawing Sheets

(56) References Cited

OTHER PUBLICATIONS

Stephane Coen et al.; "White-Light Supercontinuum Generation With 60-ps. pump pulses in a Photonic Crystal Fiber"; Sep. 1, 2001; Optics Letters; Optical Society of America; vol. 26, No. 17; pp. 1356-1358.

Kay Schuster et al.; "Microstructured Fibers with Highly Nonlinear Materials"; Opt Quant Exctron (2007) 30: pp. 1057-1069; Springer Science+Business Media, LLC; DOI 10.1007/s11082-007-961-x.

Jinendra K. Ranka et al.; "Visible continuum generation in air-silica microstructure optical fibers with anomalous dispersion at 900 nm"; Jan. 1, 2000; Optics Letters; Optical Society of America; vol. 25, No. 1; pp. 25-27.

* cited by examiner

SYSTEM FOR CONTINUOUSLY GENERATING POLYCHROMATIC LIGHT BY MEANS OF DOPED MICROSTRUCTURED OPTICAL FIBRE

BACKGROUND

1. Technical Field

The present invention refers to the field of broad spectrum light generation, in a spectral field from blue to near infra-red.

It more particularly refers to a system for generating polychromatic light, including:

- an optical pumping means suitable for continuously or quasi-continuously emitting a monochromatic or quasi-monochromatic radiation according to a pumping wavelength,
- a light guiding means arranged such as to emit polychromatic radiation continuously or quasi-continuously at the output thereof, and
- means for coupling between the pumping and guiding means.

It also refers to various uses of such a system for generating polychromatic light.

2. Background Art

It is known from the prior art to typically generate a white light using an incandescent lamp. Nevertheless, this type of source has the disadvantage of providing a light of which power (or illumination) and space coherence are significantly weak.

A general problem in the field in question thus relates to the generation of high power and high spatial coherence polychromatic light.

In another known solution, a supercontinuum source pumped by a pulsed laser is used.

In this respect, patent document FR 2867574 describes for example a device for generating polychromatic light, including optical pumping means for emitting a radiation of at least two different excitation wavelengths, as well as light guiding means arranged, in case of a nonlinear excitation by the radiation, to emit polychromatic light on an output thereof. To this end, the guiding means comprise a non-linear medium, which allows the set-up of several frequency conversions. The optical pumping means comprise a laser cavity emitting at least two different wavelengths. The guiding means thus allow a large extension of the spectrum of the light oscillating in the laser cavity.

Patent document FR 2884623 describes a device for generating polychromatic light, further comprising optical pumping means, light guiding means and selective injection means. The pumping means are suitable to emit a first radiation of a first wavelength. The selective injection means make it possible to inject the first radiation emitted from the pumping means in the guiding means, the latter being arranged to generate a harmonic corresponding to the selective injection and to output polychromatic light, by means of a non-linear excitation from this first radiation and this harmonic. To this end, the guiding means may include a microstructured optical fiber and be substantially of monomode type for the first radiation and substantially of multimode type for the harmonic.

However, owing to the use of pulsed lasers, this type of source can provide only packets of white light at the guiding means output, which limits the output luminous power. Moreover, since it is a matter of using such a source in combination with other measuring equipment for detection or measurement applications, the pulse generation requires the synchronization of this source with the other apparatuses, which makes the resulting system complicated.

Such sources were the object matter of other publications, for example:

"Visible CW-pumped supercontinuum" (A. Kudlinski and al.; Optics Letters; Oct. 15, 2008; Vol. 33, No 20, pp. 2407-2409), "Microstructured fibers with highly nonlinear materials" (K. Schuster and al.; Opt Quant Electron; Dec. 12, 2007; pp. 1057-1069), "Visible continuum generation in air-silica microstructure optical fibers with anomalous dispersion at 800 nm" (Jinendra and al.; Optics Letters; No 25; 2000; pp. 25-27), and "White-light supercontinuum generation with 60-ps pump pulses in a photonic crystal fiber" (S. Coen and al.; Optics Letters; No 26; 2001; pp. 1356-1358).

Thus, the related art provides no solution which makes it possible to have a high spatial coherence and high power polychromatic light source covering all the field of visible light, while being implementable in a simple manner with currently available apparatuses and without synchronization.

SUMMARY OF THE INVENTION

Accordingly, one of the objects of the invention is to provide a system capable of generating polychromatic light having a high power spectral concentration in the entire spectral field of visible light.

Another object of the invention is to provide a system which does not require a preliminary synchronization with additional measuring equipment.

Another object of the invention is to be able to generate polychromatic light in a simple manner using available robust and inexpensive laser sources.

These various problems are solved according to the invention by the combination of a continuous (or quasi continuous) pump laser and a strongly doped microstructured optical fiber, whose geometry and doping rate are suitably selected so as to adapt it to the pump laser.

More specifically, the object of the invention is a system for generating polychromatic light such as described above, i.e. including:

- an optical pumping means suitable for continuously or quasi-continuously emitting a monochromatic or quasi-monochromatic radiation according to a pumping wavelength,
- a light guiding means arranged such as to emit polychromatic radiation continuously or quasi-continuously at the output thereof, and
- means for coupling between the pumping and guiding means.

In this system, the guiding means comprises a microstructured optical fiber operating in the fundamental mode whose core is at least partially doped at a doping rate higher than 3 mol. % with a material exhibiting an intrinsic non-linear response higher than 2/W/km. Moreover, the geometry of the aforesaid optical fiber and the doping rate of the core are determined so as to adapt the null dispersion wavelength ($\lambda dn$) of the optical fiber to the pumping wavelength ($\lambda p$).

Accordingly, the invention has the following advantages:

The use of a high doping in the fiber core makes it possible to use a pump laser much less powerful or of a much shorter fiber than what would be necessary to obtain the same results with a non doped fiber.

The use of a temporally continuous pump makes it possible to avoid the synchronization issues inherent to the use of pulsed laser sources.

The control of the Raman gain and the chromatic dispersion of the optical fiber (via the doping rate of the core and the geometry of the fiber) makes it possible to significantly increase the frequency shifting effectiveness of solitons and thus to improve the generation of the supercontinuum by increasing its spectral width.

The combination provided by the invention (between a continuous laser and a particularly adapted optical fiber) thus makes it possible to generate a supercontinuum light having a spectral extension comparable to what is obtained in prior art with pulsed lasers, but this time with powerful continuous lasers, which makes it possible to obtain spectral concentrations and a much higher effectiveness at the fiber output, in a spectral field running from visible to the near infra-red.

In the preferred embodiment, the matching of the optical fiber null dispersion wavelength ($\lambda$dn) to the pumping wavelength ($\lambda$p) is such that $\lambda$dn<$\lambda$p. The null dispersion wavelength of the fiber is thus made lower than the pumping wavelength. In this regard, the skilled man will readily carry out a suitable geometry.

In this last case, this matching of the null dispersion wavelength ($\lambda$dn) of the optical fiber to the pumping wavelength ($\lambda$p) is preferably such that $\lambda$dn$\in$[$\lambda$p−L; $\lambda$p], L representing a wavelength of a hundred nanometers.

More precisely, in the most advantageous embodiment, the matching of the null dispersion wavelength ($\lambda$dn) of the optical fiber to the pumping wavelength ($\lambda$p) is such that $\lambda$dn$\in$[$\lambda$p−L; $\lambda$p], L representing a length of about ten nanometers.

Herein, a man skilled in the art will understand that the closer the null dispersion wavelength of the fiber to the pumping wavelength is, while remaining lower than the latter, the better the matching is performed.

In a particular embodiment aiming at carrying out a microstructured fiber, the core of the optical fiber is provided such that it is surrounded by a plurality of air pockets.

With regard to the fiber geometry, it will also be appreciated by a man skilled in the art that the smaller the core diameter is, the more favorable this geometry is to the production of non-linear effects in accordance with the invention Thus, preferably, the size (d) of the air pockets is lower than 4 μm.

Also, preferably, the spacing ($\Lambda$) between the air pockets is lower than 6 μm.

With regard to the doping rate (N) of the optical fiber core, it is determined such that the core Kerr and Raman coefficients are high, within the limit of the matching of the null dispersion wavelength ($\lambda$dn) of the optical fiber to the pumping wavelength ($\lambda$p).

For the sake of a better coupling between the pumping and guiding means, the light coupling means may be arranged so that the fundamental mode of the radiation emitted by the optical pumping means corresponds to the fundamental mode capable of propagating in the optical fiber.

Preferably, the optical fiber exhibits a weak attenuation at wavelengths substantially close to 1380 nanometers. To this end, a reduction in the content of OH⁻ ions of the fiber is carried out.

In order to carry out the doping of the optical fiber, at least a material constituting the core thereof is made of a doping element capable of generating non-linearity exaltation.

Preferably, this doping element capable of generating non-linearity exaltation is one of Germanium and Phosphorus. This doping element can also be a material whose properties are similar to those of Germanium or Phosphorus.

Also preferably, the optical fiber is monomode or slightly multimode at the pumping wavelength ($\lambda$p).

Several alternative embodiments of the optical fiber core can be implemented. In particular, the diameter ($\phi$) of the core:
- can remain constant along the optical fiber, or
- can vary along the optical fiber and more particularly decrease over at least a portion of the length of the optical fiber.

Among the other alternative embodiments of the optical fiber core, it can be particularly provided that:
- the size (d) of the air pockets be variable along the optical fiber, and/or
- the spacing ($\Lambda$) between the air pockets be variable along the optical fiber, and/or
- the ratio d/$\Lambda$ between the size (d) of the air pockets and the spacing ($\Lambda$) between the air pockets varies along the optical fiber.

BRIEF DESCRIPTION OF THE DRAWINGS

The invention will be better understood upon reading the detailed description of a non-limitative embodiment, accompanied by drawings representing respectively.

DETAILED DESCRIPTION OF THE PREFERRED EMBODIMENT(S)

Figure 1:
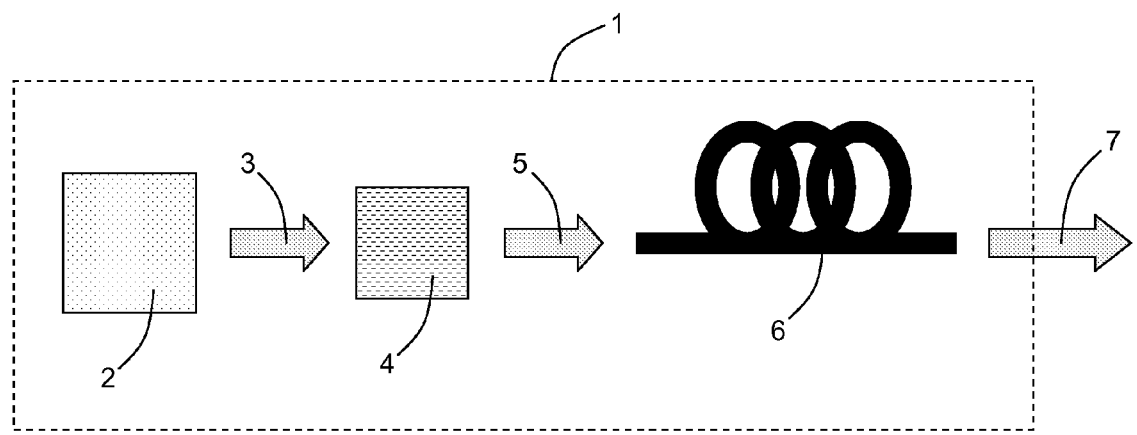
FIG. 1, a general diagram of a system for generating polychromatic light according to a first embodiment of the invention, FIG. 2, a diagram of a cross-sectional view of the optical fiber constituting the light guiding means according to this first embodiment, FIGS. 3A to 3D, various geometries of the optical fiber constituting the light guiding means according to various alternative embodiments, FIGS. 4A to 4C, diagrams illustrating various embodiments for the coupling means of the system according to the invention, and FIGS. 5 to 8, diagrams illustrating various uses of the system for generating polychromatic light according to the invention.

With reference to FIG. 1, a system for generating polychromatic light, according to a first embodiment of the invention, comprises:
- optical pumping means 2,
- coupling means 4, and
- guiding means 6.

The optical pumping means 2 is a source of light capable of emitting monochromatic or quasi-monochromatic radiation 3, according to a pumping wavelength $\lambda$p. A pump laser source constitutes an example of a suitable pumping means type. This source emits a continuous or quasi-continuous laser beam, with a line width lower than several nanometers and a power of about a few Watts or a few tens of Watts. The term "quasi-continuous" is used in its usual meaning for the skilled person, i.e., the pump source is neither of a mode locking type, nor tripped.

Figure 4:
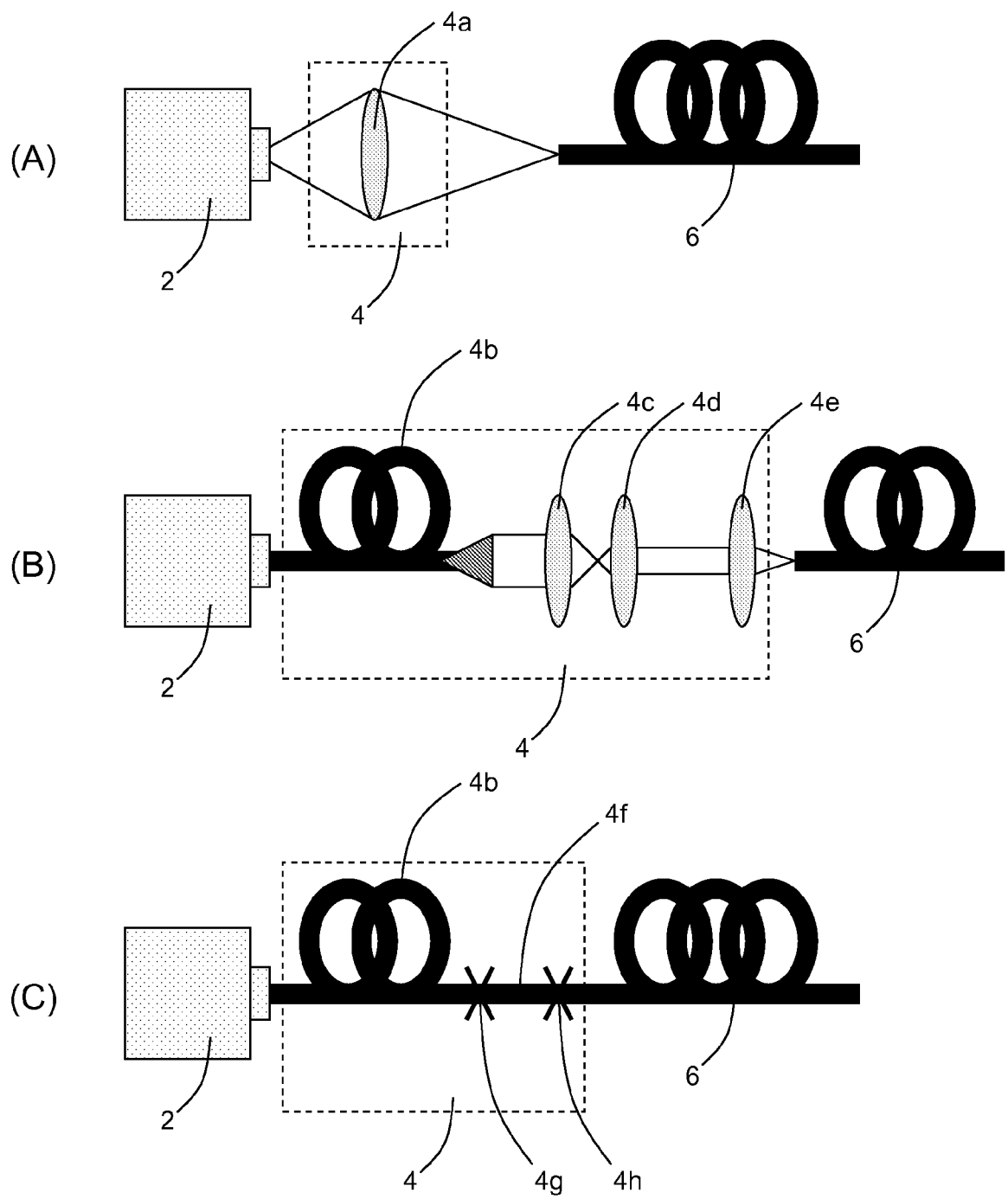

The coupling means 4 just makes it possible to couple light 3 from the pumping means 2 with the guiding means 6, so that this resulting light 5 is injected into this guiding means 6 where the non-linear effects will be observed. Several alternative embodiments of this coupling means will be discussed hereafter with reference to FIG. 4.

The light guiding means comprises an optical fiber 6. This fiber receives light 5 emitted from the coupling means 4, to emit a radiation 7 at the output thereof. Because of the continuous or quasi-continuous mode of the pumping means 2, the temporal mode of this radiation 7 will be continuous or quasi-continuous. In addition, according to the invention, this radiation 7 must be polychromatic.

The skilled person will readily appreciate that the performance of the system according to the invention is closely related to the geometry of the fiber and the doping rate of the core.

More particularly, according to the invention, the selected optical fiber 6 is a doped microstructured optical fiber, whose geometry and core doping rate are determined so as to match the null dispersion wavelength λdn of the fiber 6 to the pumping wavelength λp. If necessary, it is reminded that the total dispersion of an optical fiber results from the combination of the material dispersion and that of the wave guide. By summing these two components a wavelength for which dispersion is null is obtained: the curve of dispersion intersects the x-axis.

Generally, based on the configuration examples described hereafter and a fiber behavior digital simulation software, a man skilled in the art can readily produce fibers of which null dispersion wavelength is matched to the pumping wavelength, this last parameter being then regarded as an entry value of the simulation.

More particularly, the fiber core is doped with a high non-linear response material. A suitable doping can take place with a material such as germanium (Ge) or phosphorus (P). To have a significant effect, doping with germanium oxide ($GeO_2$) or phosphorus oxide ($P_2O_5$) must be higher than a few mol %, typically higher than 3 mol %. This high doping makes it possible to increase the Raman gain and Kerr non-linearity to a significant degree and thus to accelerate the dynamics of spectral widening.

Figure 2:
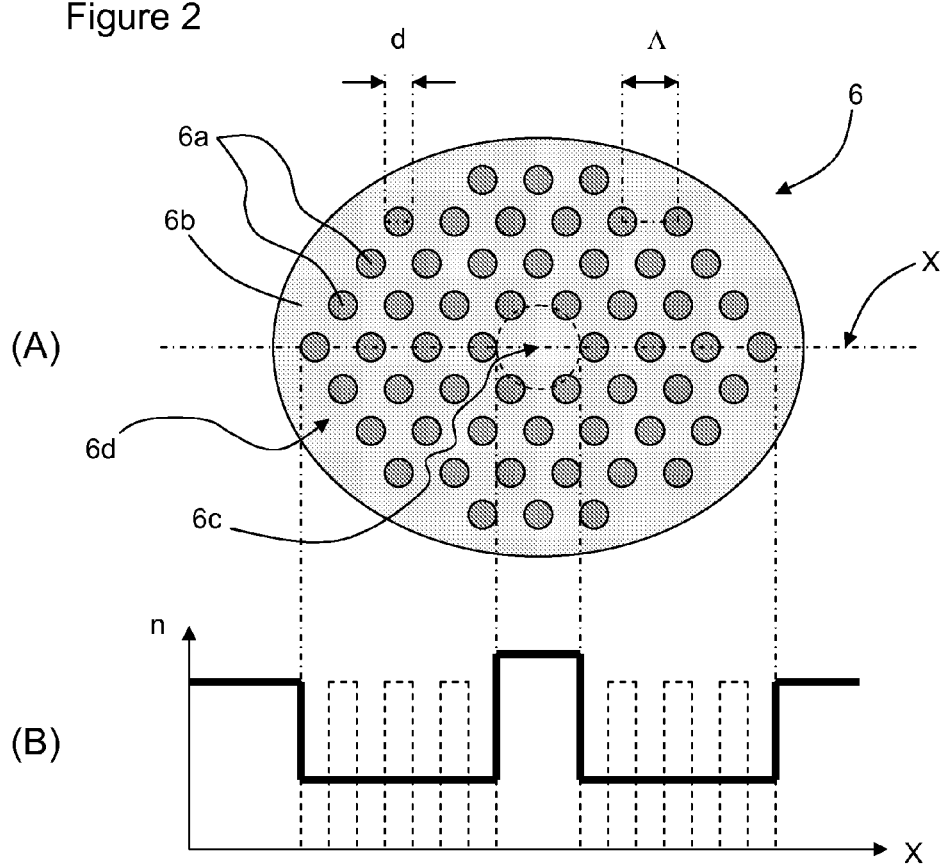

FIGS. 2A and 2B illustrate the geometry type to implement to make it possible to obtain the desired spectral widening with a continuous pump laser. This figure represents a cross-sectional view of the fiber. It should be noted in this regard that if the transversal representation of this fiber suggests an elliptic profile, herein, the present invention is applicable to any fiber profile, in particular, a circular or elliptic profile.

This fiber 6 is made up of a material 6b at least partially doped in accordance with the doping described above, and a series of air pockets 6a. This series of air pockets makes it possible to delimit the fiber core 6c (the area where there are no more air pockets, delimited by dotted lines) and the sheath 6d (the remainder of the fiber where the air pockets are located). Herein, the air pockets bordering the core 6c are arranged according to a hexagon. Preferably, these air pockets 6a exhibit a cylindrical profile.

More particularly, FIG. 2A shows that this series of air pockets 6a is homogeneously arranged in the fiber, except at the center of the latter where there are no air pocketsair pockets. By operating a cross-sectional cut of the fiber along axis X and by observing the value of the refraction index therein (FIG. 2B), the dotted lines show the succession of index areas of material (high) and of index areas of air (weak). Because of the homogeneity of the air pockets in the fiber, these air areas give an average refraction index. On the other hand, at the center of the fiber (core 6c), a higher index is observed, this slight increase resulting from the germanium or phosphorus ions doping. Because of the distribution of the refraction index within the fiber, as shown in FIG. 2B, optical fiber 6 exhibits a behavior comparable to that of a step index fiber. Indeed, the air pockets in the sheath make it possible to obtain an average index weaker than that of silica. By controlling their proportion, it is possible to adjust the value of the index step and thus the properties of guidance of the fiber. The pump wavelength being generally fixed, the properties of the wave guide are adapted to achieve the desired result.

If the doping rate characterizes the fiber doping, two other parameters make it possible to characterize the geometry of this fiber: the size d of an air pocket and the distance Λ between two air pockets.

FIGS. 3A to 3D illustrate how to obtain an optimal geometry of the microstructured optical fiber 6 so as to adapt its null dispersion wavelength to the pumping wavelength, while benefiting from a substantial spectral widening in the continuous or quasi-continuous mode. These performances will be more readily achieved the lower the size of the diameter.

Figure 3:
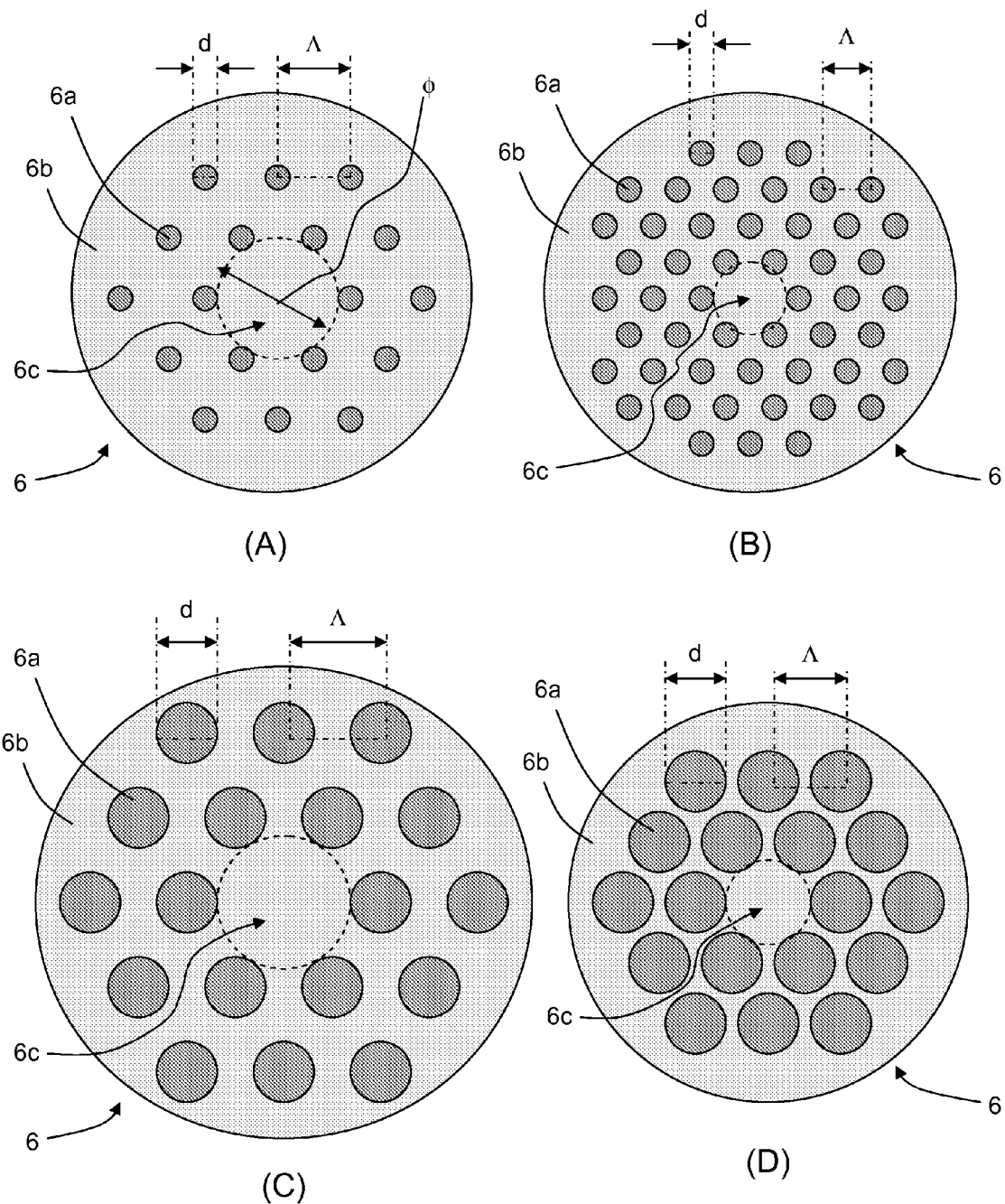

FIGS. 3A and 3B show the case of low-sized air pockets (d is small). On FIG. 3A, the air pockets are highly spaced apart (Λ is large) and consequently the diameter of the core 6c is very large. On FIG. 3B, the air pockets are not highly spaced apart (Λ is small) and consequently the diameter of the core 6c is made smaller.

FIGS. 3C and 3D show the case of large-sized air pockets (d is large). On FIG. 3C, the air pockets are highly spaced apart (Λ is large) and consequently the diameter of the core 6c is relatively large. On FIG. 3D, the air pockets are not highly spaced apart (Λ is small) and consequently the diameter of the core 6c is made very small.

As a comparison between the cases exposed on FIGS. 3B and 3D, the diameter of the core is smaller in the case of FIG. 3D. For a substantially identical distance Λ between the air pockets, the core is thus smaller with air pockets of which sizes are large (d is large).

Finally, it appears that the size of the fiber core—and consequently the performance of the system according to the invention—are smaller when:
  ratio d/Λ between size d of the air pockets and spacing Λ between the air pockets 6a is high, and when
  spacing Λ between the air pockets 6a is weak.

The orders of magnitude concerning the fiber geometry are as follows:
  distance (Λ) between the air pockets is about 4 to 6 μm,
  diameter (d) of an air pocket is about 1 to 4 μm, typically 2.5 μm,
  d/Λ ratio can be regarded as weak when it is lower than 0.3 and strong when it is higher than 0.5, it could be typically equal to 0.8 μm, and
  the number of air pockets in the fiber lies between 6 (hexagonal fitting) and several hundred air pockets, typically around 100.

A man skilled in the art will appreciate that an homogeneous arrangement of circular air pockets (according to a regular triangular mesh) on the transverse cross-section of the fiber is a preferred embodiment. It is however possible to use air pockets whose form is other than circular, and to arrange them in a non-homogeneous (i.e. according to an unspecified mesh). It will be noted however that the digital values given above were only validated for a cylindrical sheath and triangular mesh fiber, with Π/3-symmetry.

A man skilled in the art will also appreciate that an homogeneous cylindrical air pocket arrangement over the fiber length is a preferred embodiment. It is however possible to use air pockets whose longitudinal profile is non-cylindrical, and to arrange them non-homogeneously along the fiber.

In order to carry out the spectral widening of light 3 from this source 2, it is injected into the guiding means 6. To carry out an optimal injection, a coupling means 6 is disposed between these pumping and guiding means.

FIGS. 4A to 4C illustrate various coupling means examples.

According to a first example (FIG. 4A), this coupling means 4 is a single convergent lens 4a.

According to a second example (FIG. 4B), this coupling means 4 comprises a first optical fiber 4b (then, source 2 may be termed as a fibered laser source), lenses 4c and 4d arranged to form an afocal system, and an aspheric lens 4e disposed in order to carry out the injection in the microstructured fiber 6 by causing the focal point of the latter lens to stand at the entrance of the fiber. Thus, a spatial shaping of the beam 3 is carried out.

According to a third example (FIG. 4C), this coupling means 4 always comprises a first optical fiber 4b (output fiber of the pump laser). This fiber 4b can exhibit a relatively short length, for example of 2 meters. This time, this fiber 4b is coupled to the microstructured fiber 6 via a short length matching fiber 4f, connected to the two other fibers via splices 4g and 4h. System 1 is then entirely fibered, the splices having a significant advantage in terms of efficiency (losses lower than 1 dB).

A man skilled in the art will note here that the coupling between source 2 and wave guide 6 may be carried out through other means within the reach of the skilled person.

Under these conditions, the invention makes it possible to significantly improve the generation of a supercontinuum. The effectiveness of the frequency shift of solitons is made larger. Consequently, a more reliable pump power or a much shorter optical fiber than that which was necessary in the prior art can be used.

In addition, since the invention makes it possible to use continuous sources, it makes it possible to avoid synchronization problems inherent to the use of pulsed sources, paving the way for new uses.

FIGS. 5 to 8 show several of these uses.

Figure 5:
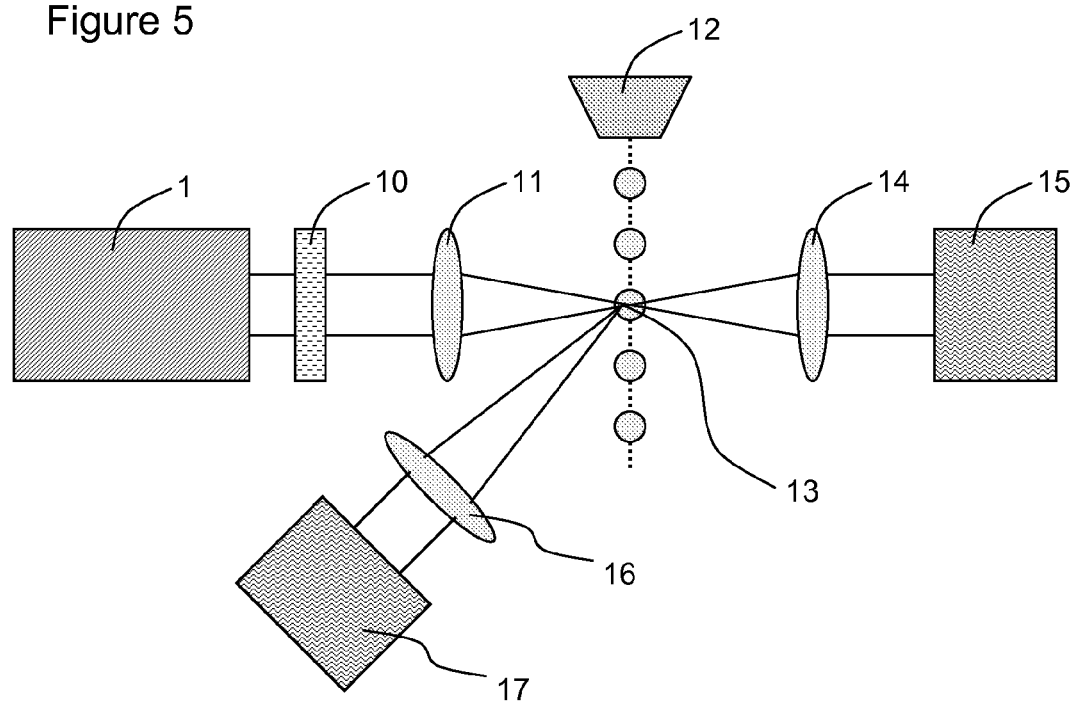

With reference to FIG. 5, the system according to the invention can be used to achieve flow cytometry, for example to carry out blood analyses. To this end, a supercontinuum source 1, in accordance with the present invention is used. This source generates a light beam having a broad spectrum and operating continuously (or quasi-continuously). This beam traverses a tunable spectral filter 10, then a lens 11. The solution to be analyzed (cells, hemoglobin . . . , with possibly a biological marker) is injected via an injector 12 so as to cross the beam generated by source 1. The location where they meet each other makes it possible to constitute the sample to analyze 13. In order to improve the sample detection and analysis capacity, a lens 14 and a first detector 15 are disposed at 180° from source 1 with respect to sample 13, and a lens 16 and a second detector 17 at 45° from source 1 with respect to sample 13. The second detector 17 is mainly used for measuring particle fluorescence.

Figure 6:
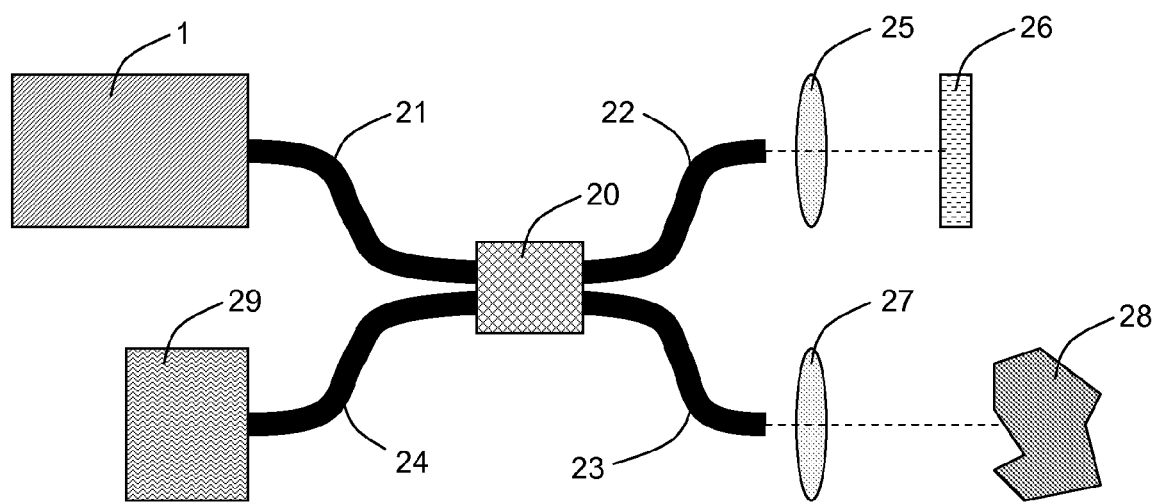

With reference to FIG. 6, the system according to the invention can be used to carry out low coherence interferometry measurements, such as for example optical coherence tomography. To this end, the supercontinuum source 1, in accordance with the present invention, is fibred via optical fiber 21 to a coupler 20. This coupler carries out the coupling of fiber 21 with three other fibers: a first fiber 22 directed towards a lens 25 and a fixed mirror 26 (constituting the interferometer reference arm), a second fiber 23 directed towards the mobile sample to be analyzed (constituting the other arm of the interferometer) and a third fiber 24 also coupled to a detector 29. This quasi-entirely fibered measurement device thus makes it possible to analyze sample 28 by interferometry.

Figure 7:
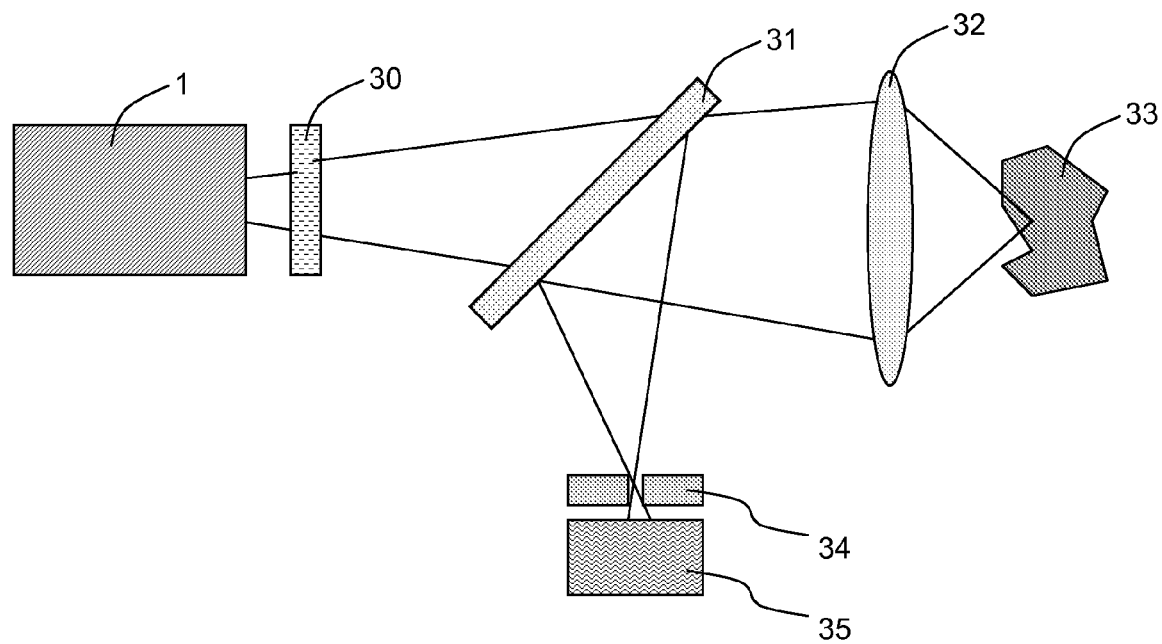

With reference to FIG. 7, the system according to the invention can be used to carry out confocal microscopy. To this end, a supercontinuum source 1, in accordance with the present invention is used. This source generates a broad spectrum light beam operating continuously (or quasi-continuously). This beam traverses a tunable spectral filter 30, then a dichroic mirror 31. A portion of the beam crosses this mirror 31 to move towards a lens 32 aimed at directing the beam towards a portion of the sample to be analyzed 33. Light reflected by this sample 33 crosses lens 32 again, then is reflected on mirror 31, which directs it towards a spatial filter 34 and a detector 35. Herein, the invention makes it possible to achieve a confocal microscopy (for example for fluorescence correlation spectroscopy measurements) with a continuous (or quasi-continuous) broad spectrum source.

Figure 8:
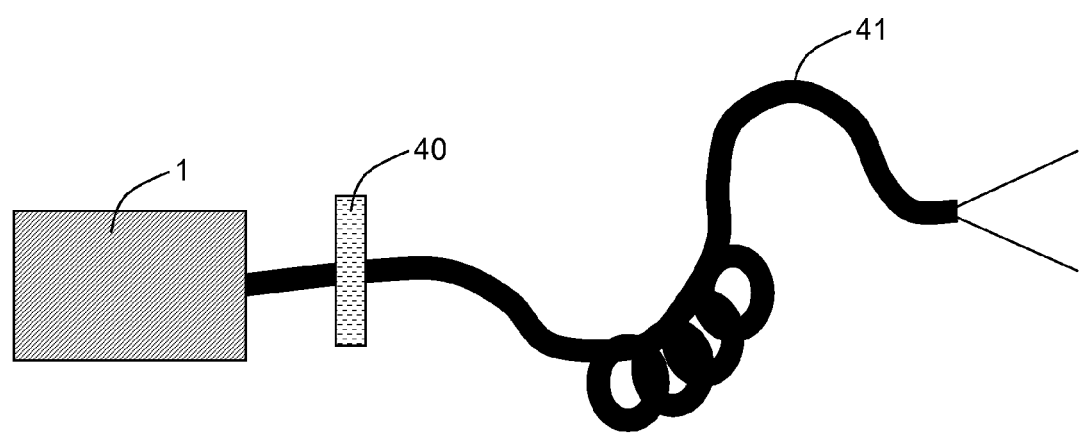

With reference to FIG. 8, the system according to the invention can be used to carry out a stand-alone lightning. To this end, the supercontinuum source 1, in accordance with the present invention, is fibred via the optical fiber 41. Through this fiber 41 a tunable spectral filter 40 may possibly be disposed. The source (and if need be, the filter) are disposed in a dedicated technical premise. The output of fiber 41 is located in the room to be lightened. For a better control of the light output from this fiber 41, a lens may be disposed at the fiber output.

The previously described embodiments of this invention are given by way of non limitative examples. It should be understood that a man skilled in the art may achieve various alternative embodiments of the invention without departing from the scope of the patent.

More specifically, the alternatives above are given as examples showing the opportunities to achieve a system for generating broad spectrum, continuous or quasi-continuous polychromatic light.

The invention claimed is:

1. A system for generating polychromatic light, including:
   a single optical pumping means capable of emitting a monochromatic or quasi-monochromatic radiation according to a pumping wavelength and a continuous or quasi-continuous mode,
   a light guiding means arranged to emit a polychromatic radiation according to a continuous or quasi continuous mode at an output thereof, and
   a coupling means for coupling between said pumping means and said guiding means, wherein said guiding means comprises a microstructured optical fiber operating in a fundamental mode a core of which is at least partially doped at a doping rate higher than 3 mol. % with a material exhibiting an intrinsic non-linear response higher than 2/W/km, and
   a geometry of said optical fiber and the doping rate of said core are determined so as to match the null dispersion wavelength of said optical fiber to said pumping wavelength.

2. The generation system according to claim 1, wherein the matching of the null dispersion wavelength ($\lambda dn$) of the optical fiber to the pumping wavelength ($\lambda p$) is made such that $\lambda dn < \lambda p$.

3. The generation system according to claim 2, wherein the matching of the null dispersion wavelength ($\lambda dn$) of the optical fiber to the pumping wavelength ($\lambda p$) is made such that $\lambda dn \in [\lambda p - L; \lambda p]$, L representing a length of a hundred nanometers.

4. The generation system according to claim 3, wherein the matching of the null dispersion wavelength ($\lambda dn$) of the optical fiber to the pumping wavelength ($\lambda p$) is made such that $\lambda dn \in [\lambda p - L; \lambda p]$, L representing a length of about ten nanometers.

5. The generation system according to claim 1, wherein the core of the optical fiber is surrounded by a plurality of air pockets.

6. The generation system according to claim 5, wherein of the air pockets have a size which is lower than 4 µm.

7. The generation system according to claim 5, wherein a spacing between the air pockets is lower than 6 µm.

8. The generation system according to claim 5, wherein the air pockets have a size which varies along the optical fiber.

9. The generation system according to claim 8, wherein spacing between the air pockets varies along the optical fiber.

10. The generation system according to claim 9, wherein a ratio between the size of the air pockets and the spacing between the air pockets varies along the optical fiber.

11. The generation system according to claim 1, wherein the doping rate of the core of the optical fiber is determined such that Kerr and Raman coefficients of said core are high, within the limit of the matching of the null dispersion wavelength ($\lambda dn$) of the optical fiber to the pumping wavelength ($\lambda p$).

12. The generation system according to claim 1, wherein the light coupling means is arranged such that a fundamental mode of the radiation emitted by the optical pumping means corresponds to the fundamental mode that can propagate in the optical fiber.

13. The generation system according to claim 1, wherein the optical fiber exhibits a weak attenuation at wavelengths substantially close to 1380 nanometers.

14. The generation system according to claim 1, wherein at least a material constituting the core of the optical fiber is made of a doping element that can generate non-linearity exaltation.

15. The generation system according to claim 14, wherein the doping element that can generate non-linearity exaltation is one of Germanium and Phosphorus.

16. The generation system according to claim 1, wherein the optical fiber is monomode or slightly multimode at the pumping wavelength ($\lambda p$).

17. The generation system according to claim 1, wherein a diameter of the core decreases over at least a portion of a length of the optical fiber.

* * * * *